(12) United States Patent
Wilcox

(10) Patent No.: US 10,962,700 B1
(45) Date of Patent: Mar. 30, 2021

(54) FIELD-RECONFIGURABLE LUMINAIRE

(71) Applicant: IDEAL Industries Lighting LLC, Durham, NC (US)

(72) Inventor: Kurt S. Wilcox, Libertyville, IL (US)

(73) Assignee: IDEAL INDUSTRIES LIGHTING LLC, Durham, NC (US)

( * ) Notice: Subject to any disclaimer, the term of this patent is extended or adjusted under 35 U.S.C. 154(b) by 0 days.

(21) Appl. No.: 16/822,212

(22) Filed: Mar. 18, 2020

(51) Int. Cl.
| | |
|---|---|
| *F21V 8/00* | (2006.01) |
| *F21V 29/76* | (2015.01) |
| *F21V 29/75* | (2015.01) |
| *F21V 9/32* | (2018.01) |
| *F21S 10/02* | (2006.01) |
| *F21S 10/00* | (2006.01) |
| *F21Y 115/10* | (2016.01) |
| *F21Y 105/10* | (2016.01) |

(52) U.S. Cl.
CPC .......... *G02B 6/0026* (2013.01); *F21S 10/005* (2013.01); *F21S 10/02* (2013.01); *F21V 9/32* (2018.02); *F21V 29/75* (2015.01); *F21V 29/763* (2015.01); *F21Y 2105/10* (2016.08); *F21Y 2115/10* (2016.08)

(58) Field of Classification Search
CPC ....... F21W 2131/103; F21V 9/00; F21V 9/08; F21V 9/30–45; F21S 8/085–088; F21S 10/02–026; F21S 10/005; G02B 6/0025–0026
See application file for complete search history.

(56) References Cited

U.S. PATENT DOCUMENTS

| | | | |
|---|---|---|---|
| 9,818,919 B2 | 11/2017 | Lowes et al. | |
| 9,952,372 B2 | 4/2018 | Wilcox et al. | |
| 10,379,278 B2 | 8/2019 | Wilcox et al. | |
| 2008/0048200 A1 | 2/2008 | Mueller et al. | |
| 2008/0157114 A1 | 7/2008 | Basin et al. | |
| 2011/0215345 A1 | 9/2011 | Tarsa et al. | |
| 2014/0192521 A1* | 7/2014 | Laakkio | G02B 6/0045 362/145 |

(Continued)

FOREIGN PATENT DOCUMENTS

WO 2014145283 A1 9/2014

OTHER PUBLICATIONS

Intematix, "Intematix ChromaLit XT; Remote Phosphor Light Source; Datasheet"; Aug. 1, 2017; pp. 1-10; Retrieved from the internet: URL: http://www.intematix.com/products/phosphor-solutions [retrieved on Jul. 26, 2019].

(Continued)

*Primary Examiner* — Mariceli Santiago
(74) *Attorney, Agent, or Firm* — Coats & Bennett, PLLC

(57) ABSTRACT

A luminaire that includes a light emitting diode (LED) array configured to produce light in a first direction along a propagation path. An optical waveguide is spaced apart from the LED array by a gap and with the optical waveguide and the gap disposed along the propagation path. The optical waveguide is configured to receive the light along the propagation path at the first waveguide surface and transmit the light away from the luminaire at the second waveguide surface. A housing is mounted to the LED array and the optical waveguide and includes a slot directly adjacent to the gap.

20 Claims, 13 Drawing Sheets

(56) References Cited

U.S. PATENT DOCUMENTS

2016/0040855 A1* 2/2016 Jang .................. F21V 29/74
                                                    362/294
2016/0186970 A1* 6/2016 Sorenson ............ G02B 6/0035
                                                    362/234
2016/0282667 A1* 9/2016 Fan ................... G02B 6/0025
2017/0031085 A1* 2/2017 Lim .................... G02B 6/32

OTHER PUBLICATIONS

Ames, "What is correlated color temperature (CCT) and how do you choose it for your lighting?", Regency Lighting; Lighting Insights from Regency Lighting; Jan. 19, 2016; pp. 1-7.

* cited by examiner

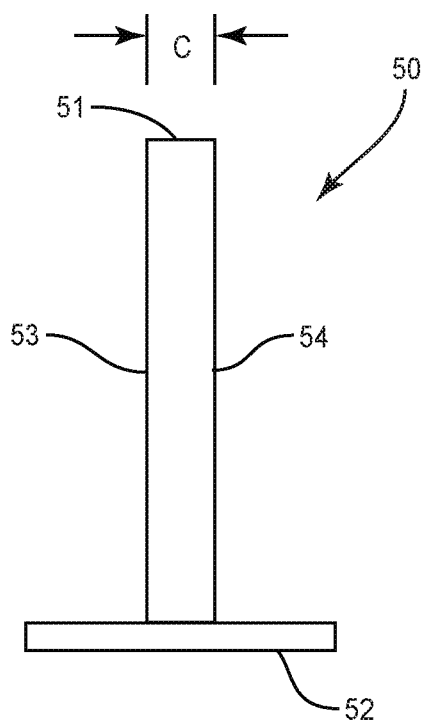
FIG. 13
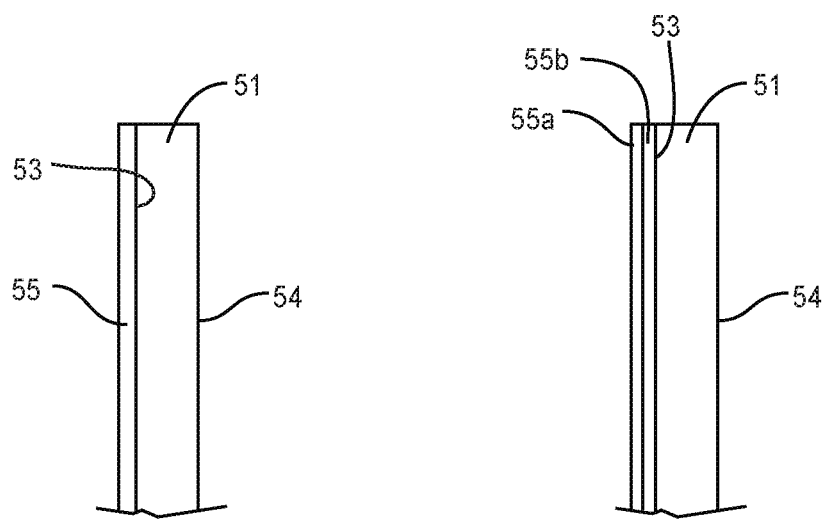
FIG. 14  FIG. 15

FIELD-RECONFIGURABLE LUMINAIRE

FIELD OF THE INVENTION

The present application is directed to luminaires and, more specifically, to luminaires with one or more that can be adjusted to change the color temperature of the emitted light.

BACKGROUND

Luminaires are used to provide lighting in a wide variety of interior and exterior contexts. Examples of exterior applications include but are not limited for an outdoor restaurant and an outdoor deck. Examples of interior applications include but are not limited to lighting retail space, restaurants, a hotel lobby, office space, and a hospital.

Luminaires can emit light with different color temperatures measured in Kelvin units. The color temperature can be selected based on the specific application. Color temperatures generally range from about 2000 degrees Kelvin to 6000 degrees Kelvin. The lower temperatures (about 2700 degrees Kelvin) are warmer and include more light in the red, orange, and yellow range. Higher temperatures (about 60000 degrees Kelvin) include more light in the blue range and provide for crisper light. Neutral temperatures (about 4000 degrees Kelvin) provide a medium setting. Specific applications include light of between 4000-5000 degrees Kelvin for outdoor lighting, 2500 degrees Kelvin-4000 degrees Kelvin for retail lighting, and 1800 degrees Kelvin-2700 degrees Kelvin for restaurants.

Luminaires are designed to be installed in a wide variety of different locations and a wide variety of contexts. For example, a manufacturer can produce a luminaire that is used by a first client in a first context (e.g., a restaurant) and used by a different second client in a second context (e.g., office space). To accommodate for both types of clients, a manufacturer is required to maintain multiple different models of the same luminaire design. This can lead to large inventories and tracking large number of model numbers to ensure clients receive the correct luminaire for their use.

It may also be desirable for a luminaire to be configurable to emit light with different color temperatures. For example, it may be desirable for a luminaire installed within a restaurant to emit light with different color temperatures at different times of the day. During lunch, a light with a cooler temperature may be desired as the clientele may be more business related. At night, light with a warmer temperature may be desired for a more family-friendly environment.

BRIEF SUMMARY

Embodiments of the present disclosure generally relate to luminaires configured to emit light. The luminaires include one or more light adaptation modules that can be mounted to adjust a color temperature of the emitted light In particular, one or more embodiments include a luminaire comprising a light emitting diode (LED) array configured to produce light in a first direction along a propagation path. An optical waveguide spaced apart from the LED array by a gap and comprises first and second waveguide surfaces. The optical waveguide and the gap are disposed along the propagation path and the optical waveguide is configured to receive the light along the propagation path at the first waveguide surface and transfer the light away from the luminaire at the second waveguide surface. A housing is mounted to the LED array and the optical waveguide with the housing comprising a slot directly adjacent to the gap.

In another embodiment, a light adaptation module is engaged with the slot and comprises an optically transmissive body that extends into the propagation path with the body configured to change a color temperature of the light that is emitted from the LED array.

In another embodiment, the optically transmissive body comprises a first surface facing the LED array and an opposing second surface facing the optical waveguide, wherein the optically transmissive body transfers light incident on the first surface to the second surface, and the second surface emits the light toward the optical waveguide.

In another embodiment, the optically transmissive body comprises a phosphor coating such that a color temperature of the light emitted from the second surface is different from a color temperature of the light incident on the first surface.

In another embodiment, the light adaptation module further comprises a flange connected to the optically transmissive body with the flange sized to engage with the housing and position the optically transmissive body across the propagation path.

In another embodiment, the flange seals the slot when engaged with the housing.

In another embodiment, the light adaptation module is a first light adaptation module configured to change a color temperature of the light emitted from the LED array a first amount and further comprising a second light adaptation module configured to change the color temperature of the light from the LED array a different second amount.

In another embodiment, each of the first light adaptation module and the second light adaptation module are configured to fit within the slot and extend across the propagation path.

In another embodiment, the light adaptation module is a first light adaptation module and the slot is a first slot with the luminaire further comprising a second light adaptation module; a second slot directly adjacent the gap and spaced away from the first slot; and wherein the second light adaptation module is engaged with the second slight and comprises a second optically transmissive body that extends into the propagation path.

One or more embodiments are directed to a luminaire comprising a housing comprising an interior cavity and a slot that extends into the interior cavity. A light emitting diode (LED) array is mounted to the housing within the interior cavity and configured to produce light along a propagation path that extends within the interior cavity. An optical waveguide is mounted to the housing with the optical waveguide positioned along the propagation path to receive the light from the LED array and transfer the light outward from the luminaire. A gap is positioned within the interior cavity along the propagation path and between the LED array and the optical waveguide. The slot in the housing being aligned with the gap.

In another embodiment, a light adaptation module comprising an optically transmissive body is configured to change a color temperature of the light emitted by the LED array with the light adaptation module configured to engage with the housing with the body extending into the slot and into the propagation path.

In another embodiment, the light adaptation module further comprising a flange mounted to an end of the body with the flange being larger than the slot to extend over the slot when the body is positioned in the slot and into the propagation path.

In another embodiment, the body of the light adaptation module comprises a phosphor coating configured to change the color temperature of the light emitted by the LED array.

One or more other embodiments include a method of configuring a luminaire comprising: switching between first and second operating modes of the luminaire; emitting light from an optical waveguide of the luminaire by operating the luminaire in accordance with the switching. The first operating mode comprises transferring the light from a light emitting diode (LED) array to the optical waveguide via a light adaptation module disposed in a gap between the array of LEDs and the optical waveguide. The second operating mode comprises transferring light from the LED array to the optical waveguide via the gap without transferring the light through the light adaptation module.

In another embodiment the switching comprises switching from the first operating mode to the second operating mode.

In another embodiment, the method further comprises modifying a color temperature of the light as the light transfers via the light adaptation module.

In another embodiment, the switching comprises switching from the second operating mode to the first operating mode.

In another embodiment, the method comprises retaining the light adaptation module within a housing of the luminaire in the first operating mode.

In another embodiment, the method comprises positioning the light adaptation module through a slot in the housing in the first operating mode.

In another embodiment, the method comprises operating the luminaire in the first operating mode when the light adaptation module is disposed in the gap and operating the luminaire in the second operating mode when the light adaptation module is absent from the gap.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

FIG. 13 is a schematic side view of a light adaptation module.

FIG. 14 is a schematic side view of a light adaptation module.

FIG. 15 is a schematic side view of a light adaptation module.

DETAILED DESCRIPTION

Figure 1:
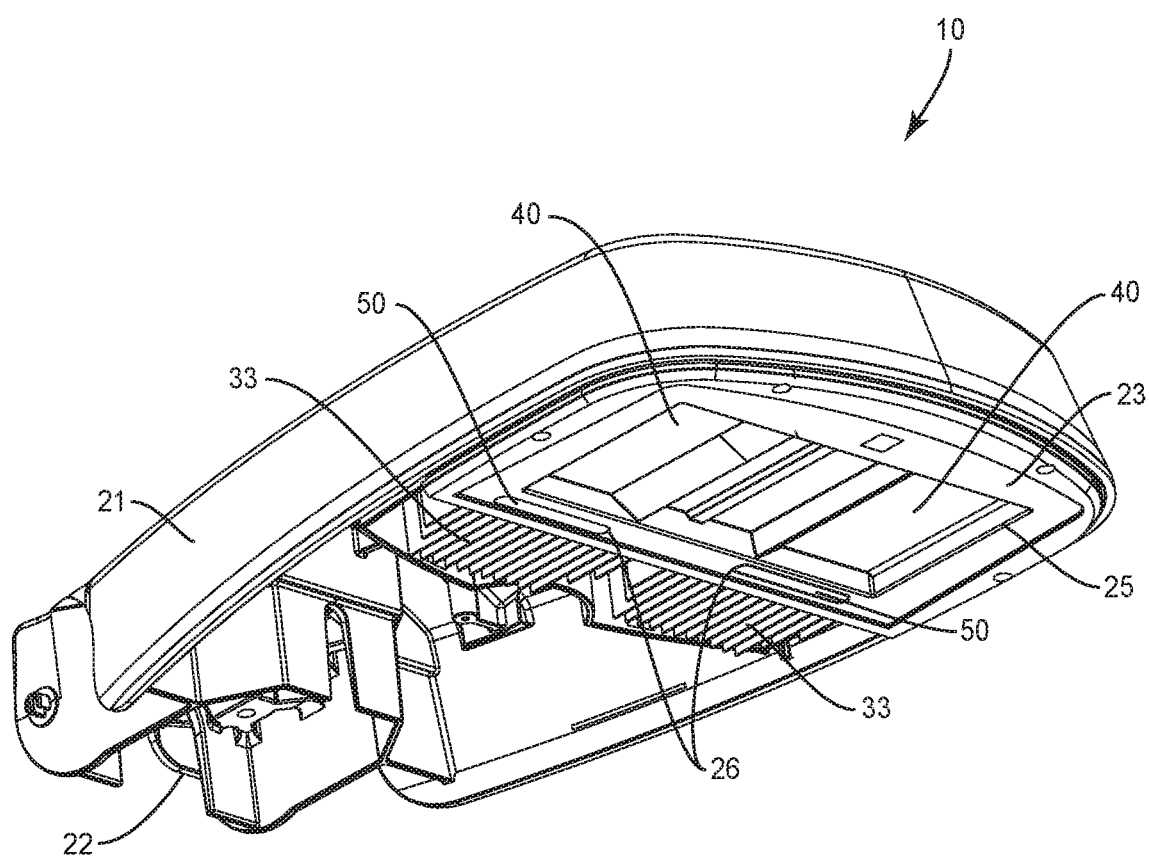
FIG. 1 is a bottom perspective view of a luminaire that includes a pair of light adaptation modules.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 2:
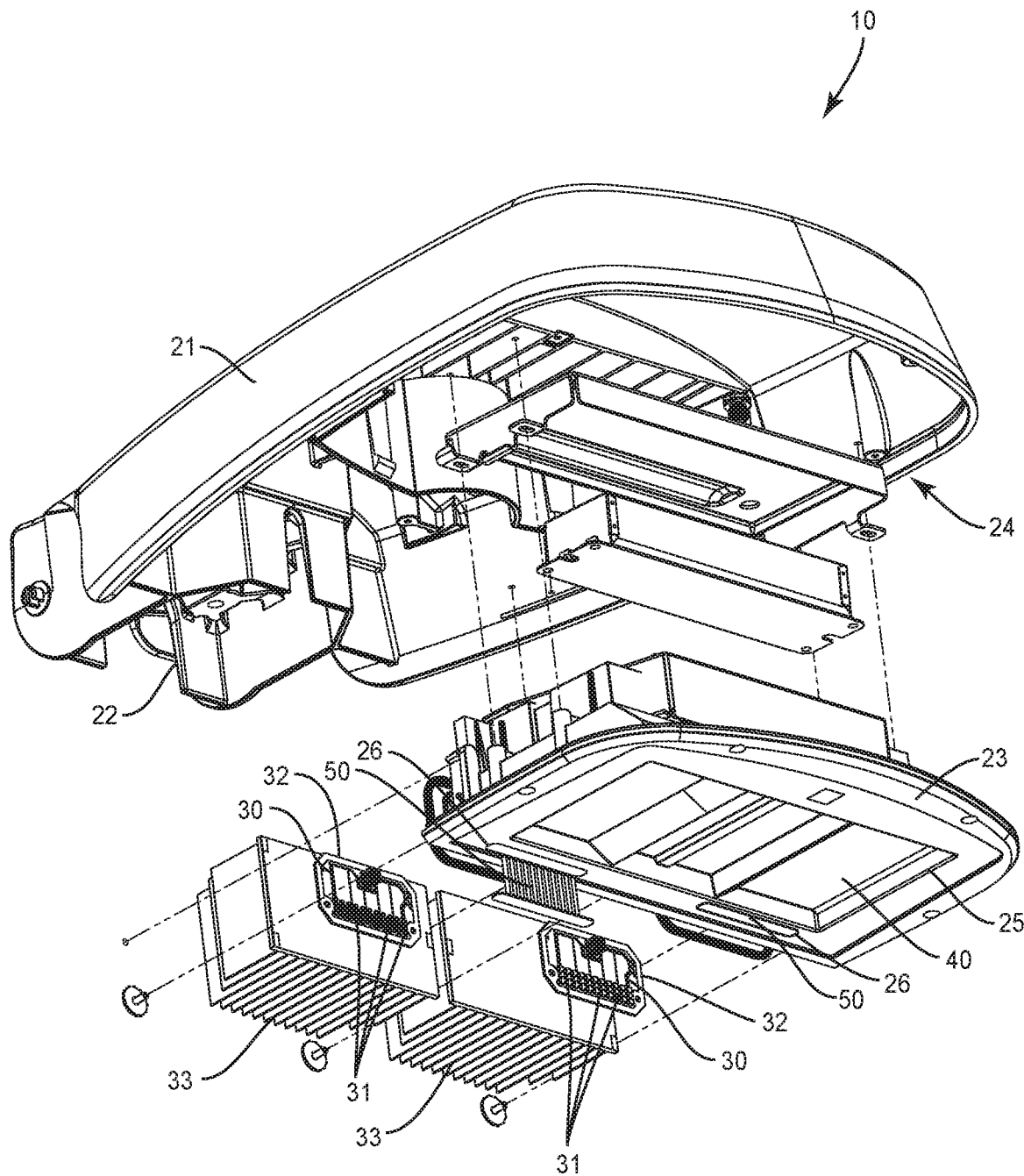
FIG. 2 is a partial exploded view of the luminaire of FIG. 1.

FIGS. 1 and 2 illustrate a luminaire 10 with a configurable light output for use in a wide variety of lighting applications. Example applications include but are not limited to outdoor illumination such as outdoor restaurants and patios, as well as indoor applications such as commercial buildings and residential homes. The luminaire 10 includes one or more LED arrays 30 that produce light. One or more optical waveguides 40 receive the light at a first surface from the one or more LED arrays 30 and transmit the light away at a second waveguide surface. One or more light adaptation modules 50 are selectively positionable between the one or more LED arrays 30 and the one or more optical waveguides 40. The light adaptation modules 50 alter the light that is emitted from the luminaire 10 to have a different correlated color temperature. A housing 20 supports the one or more LED arrays 30 and waveguides 40 and includes one or more slots 26 for insertion of the one or more light adaptation modules 50.

Figure 3:
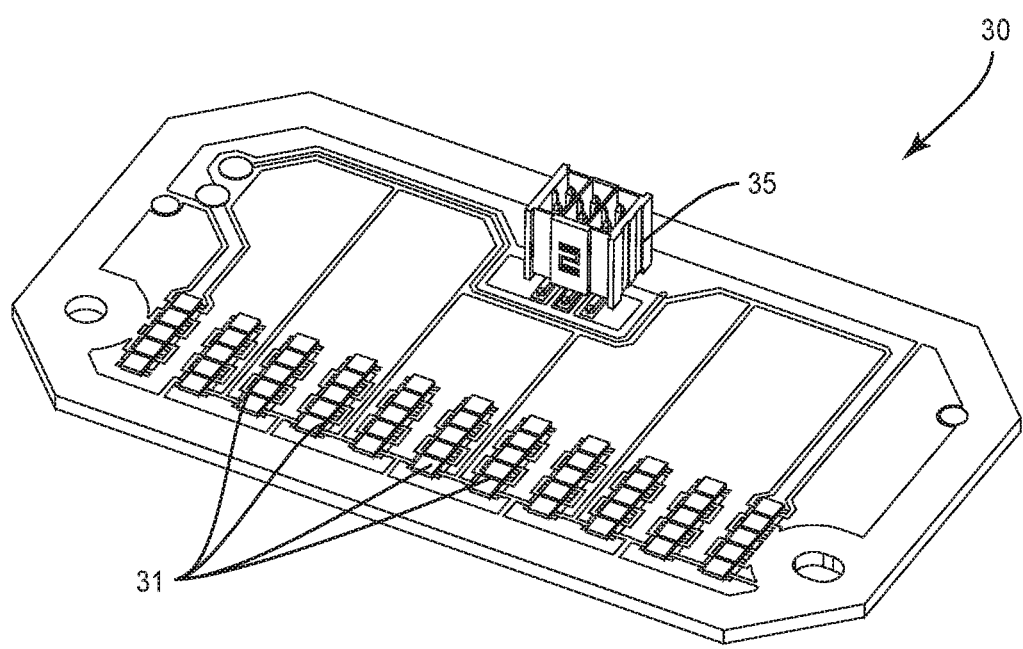
FIG. 3 is a perspective view of an LED array.
Figure 4:
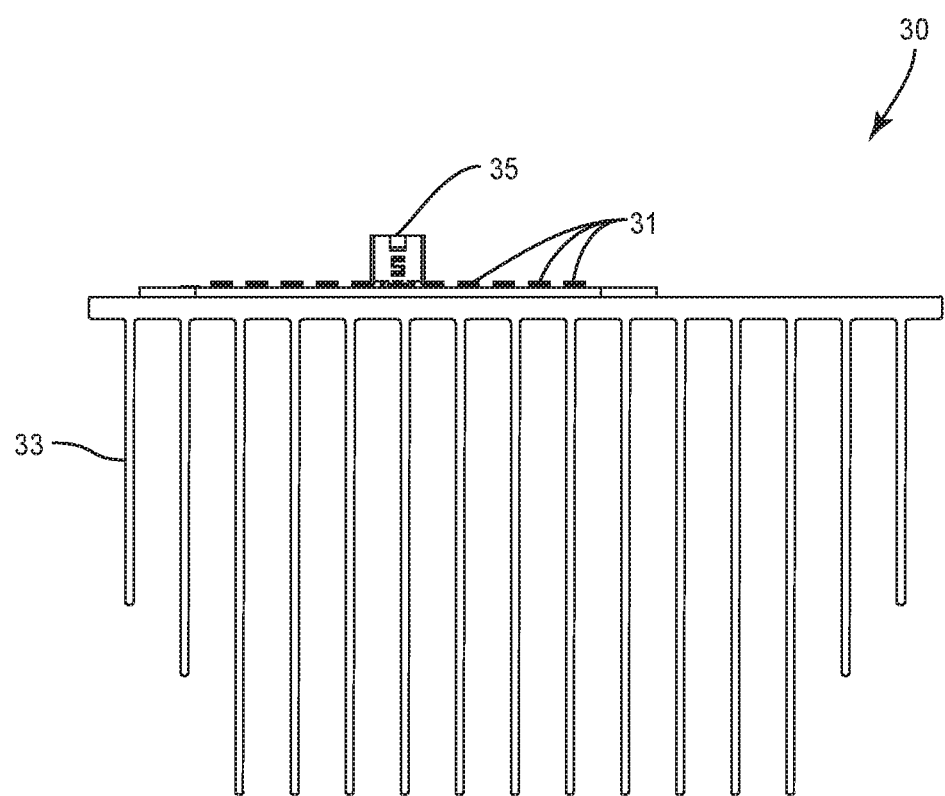
FIG. 4 is a side view of an LED array mounted on a heat sink.
Figure 5:
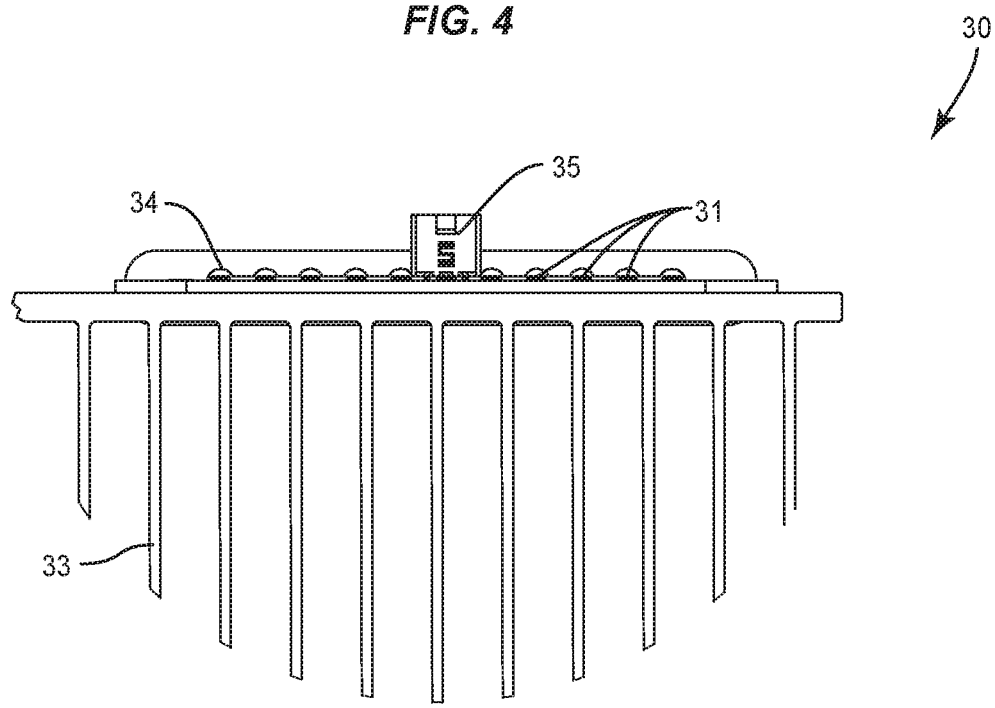
FIG. 5 is a side view of an LED array mounted on a heat sink with a light adaption module positioned over the LED array.

As illustrated in FIGS. 3, 4, and 5, each LED array 30 comprises one or more LED elements 31. The LED elements 31 can have a lambertian or near-lambertian light distribution, although each may have a directional emission distribution (e.g., a side emitting distribution), as necessary or desirable. More generally, any lambertian, symmetric, wide angle, preferential-sided, or asymmetric beam pattern LED element 31 can be used.

In one example, each LED element 31 is a single white or other color LED chip or other bare component. In another example, each LED element 31 includes multiple LEDs either mounted separately or together. In the various embodiments, the LED elements 31 can include, for example, at least one phosphor-coated LED either alone or in combination with at least one color LED, such as a green LED, a yellow LED, a red LED, etc. In one example as illustrated FIG. 5, one or more of the LED elements 31 are disposed within a coupling cavity 34 with an air gap disposed between the LED element 31 and a light surface.

A substrate 32 supports and positions the one or more LED elements 31. In one example, the support member 32 is a printed circuit board. The substrate 32 can include various shapes and sizes depending upon the number and arrangement of the LED elements 31. Each LED element 31 receives power from an LED driver circuit or power supply of suitable type, such as a SEPIC-type power converter and/or other power conversion circuits. A connector 35 on the substrate 32 is operatively connected to the LED elements 31 to provide power and/or control signals.

The LED arrays 30 can be mounted on a heat sink 33 that transfers away heat generated by the one or more LED elements 31. The heat sink 33 provides a surface that contacts against and supports the substrate 32 and one or more fins. The heat sink 33 cools the one or more LED elements 31 allowing for operation at desired temperature levels.

FIG. 5 illustrates a light adaptation module positioned over the LED array 30.

Figure 6:
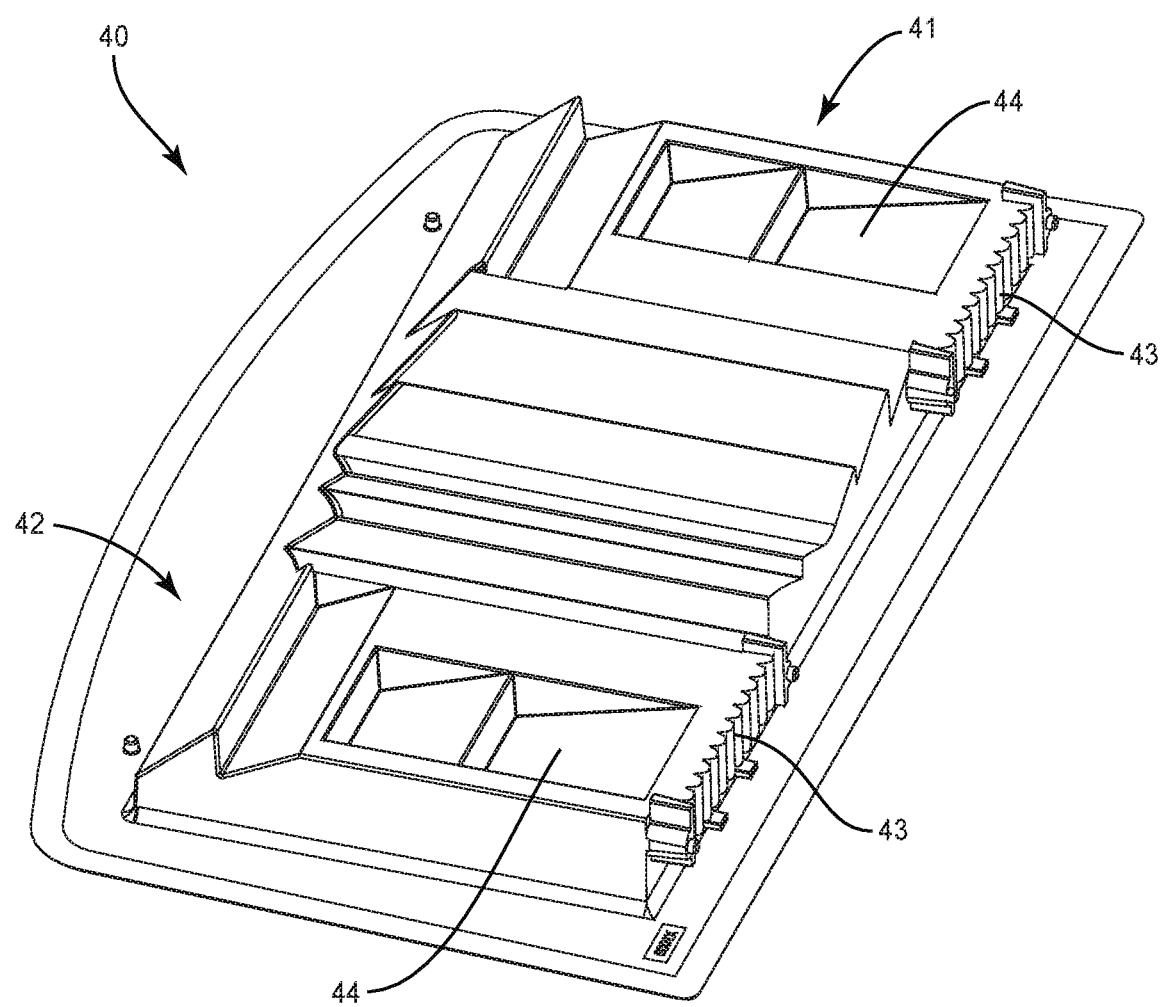
FIG. 6 is a top perspective view of a waveguide.
Figure 7:
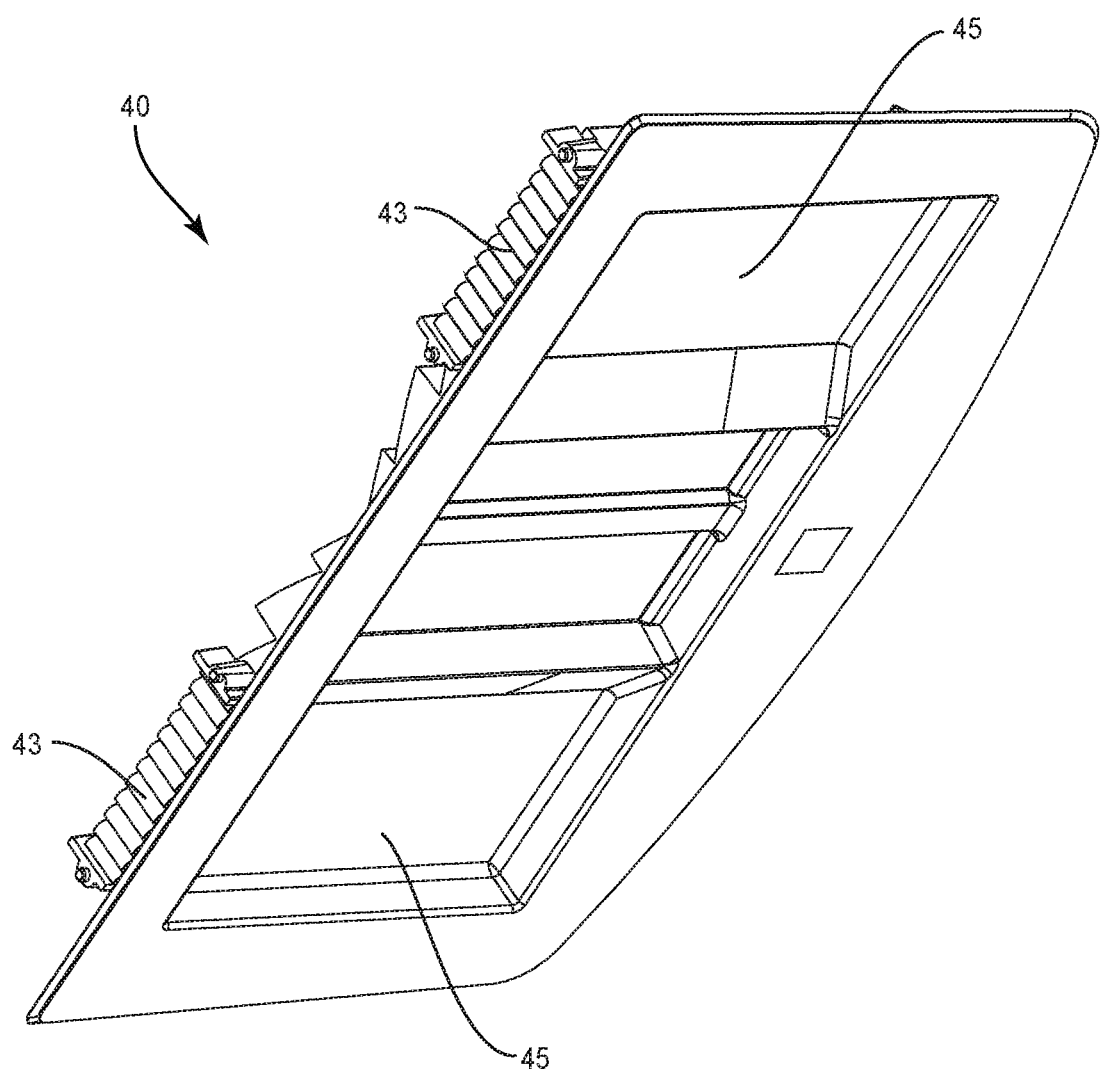
FIG. 7 is a bottom perspective view of the waveguide of FIG. 6.
Figure 8:
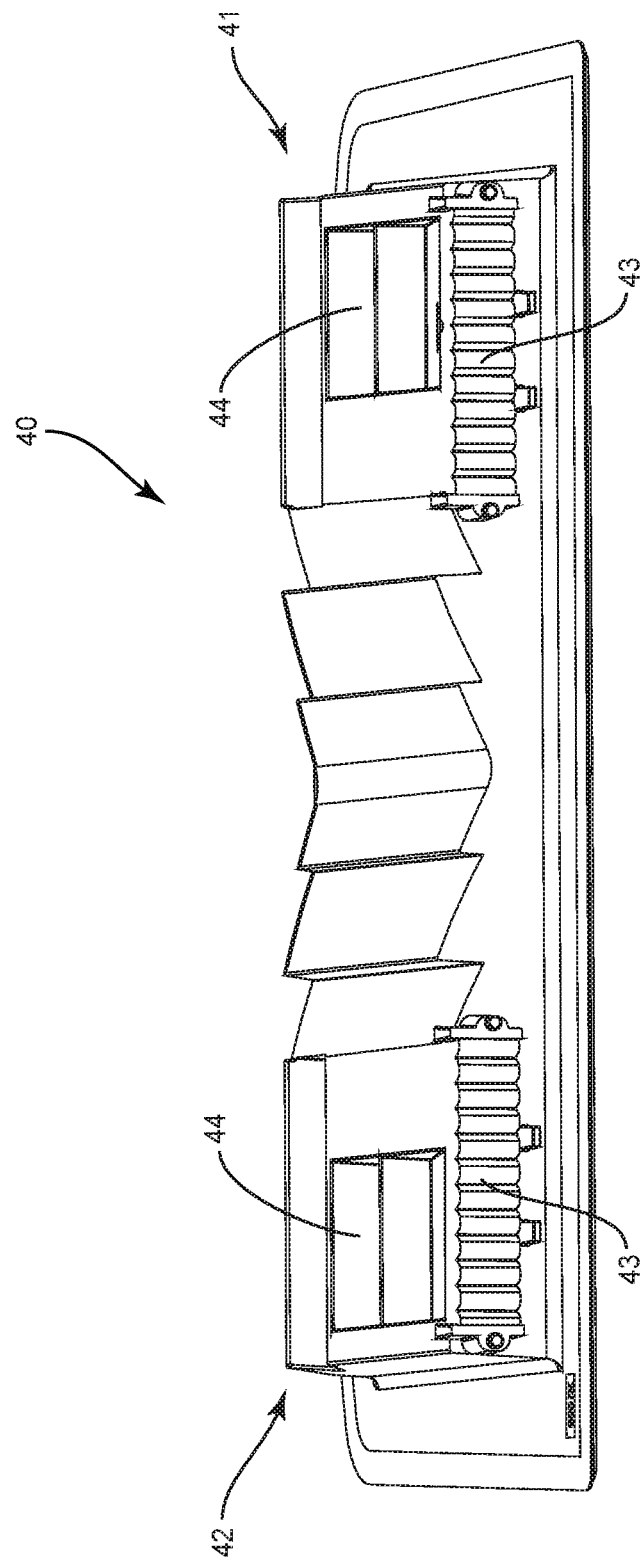
FIG. 8 is a perspective view of the waveguide of FIG. 6.
Figure 9:
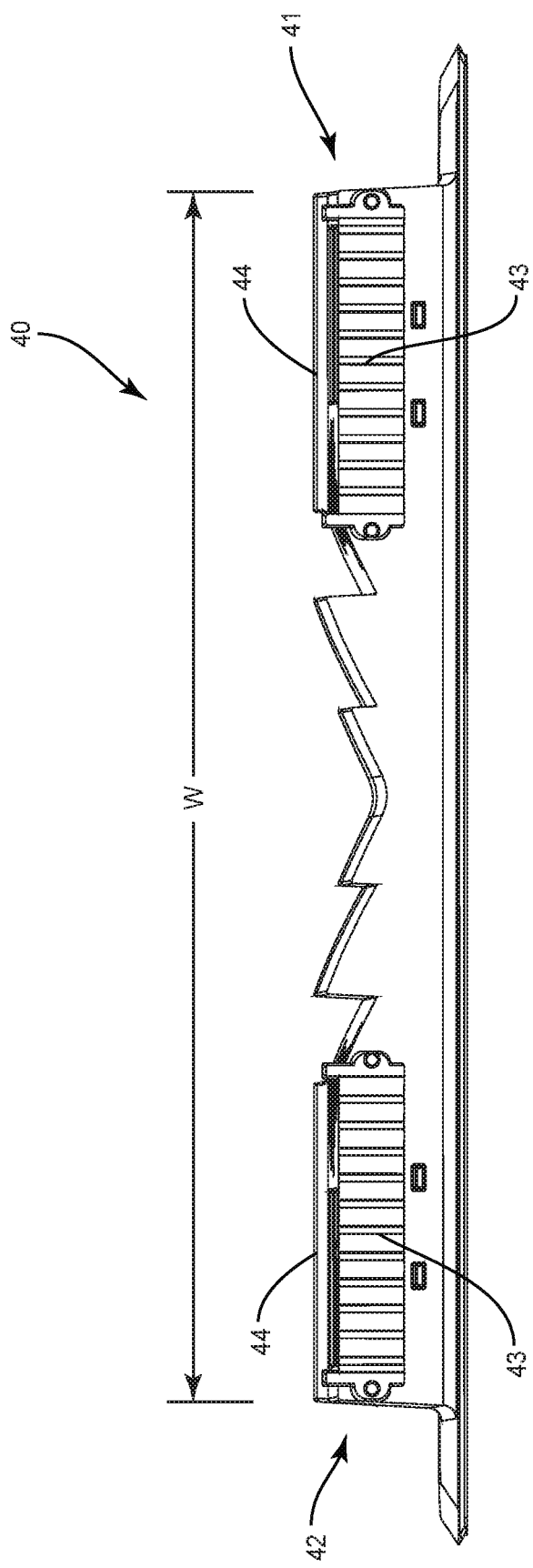
FIG. 9 is a perspective view of the waveguide of FIG. 6.

The waveguide 40 receives the light emitted from the one or more LED arrays 30. In one example as illustrated in FIGS. 6 and 7, a single waveguide 40 receives the light. Other examples include two or more waveguides 40 that receive the light. In the various examples, the waveguide 40 is made of suitable optical materials, such as one or more of acrylic, air, polycarbonate, molded silicone, glass, cyclic olefin copolymers, and/or a liquid, including water and/or mineral oils, and combinations thereof, possibly in a layered arrangement, to achieve a desired effect and/or appearance.

In one example, the waveguide 40 includes a single first surface that receives light from an LED array 30. The waveguide 40 includes a second surface from which the light is emitted. In the example of FIGS. 6 and 7, the waveguide 40 includes a first section 41 that receives light from a first LED array 30 and a second section 42 that receives light from a second LED array 30. The two sections 41, 42 are laterally spaced apart across the waveguide 40. In one example, each of the two sections 41, 42 are substantially similar to receive and direct light in a similar manner. In another example, the two sections 41, 42 are different to receive and/or direct light in different manners.

Each of the sections 41, 42 includes a coupling portion 43 that faces towards and receives the light from the LED array 30. The coupling portions 43 can include various configurations, such as but not limited to smooth, textured, curved, or otherwise shaped to affect light mixing and/or redirection. In one example, the surface includes an arrangement of protrusions separated from one another by intervening grooves to promote light and/or color mixing. The arrangement can also promote illuminance uniformity.

The sections 41, 42 include a surface 44 with light redirection features to redirect the light into the waveguide 40 and a surface 45 with light extraction features to emit the light outward away from the waveguide 40 towards the intended target. The light redirection features and light extraction features can be regularly or irregularly spaced across the surfaces 44, 45.

The housing 20 supports and positions the one or more LED arrays 30 and waveguides 40 within the luminaire 10. As illustrated in FIGS. 1 and 2, the housing 21 includes a base 21. The base 21 includes a substantially concave shape with a closed side that forms an outer surface of the luminaire 10, and an opposing open side. One or more mounts 22 are positioned on the base 21 for mounting the luminaire 10 at the desired location. In one example, the mount 22 includes a receptacle to receive a support pole, such as a light pole for and outdoor application. In another example, the mount 22 includes a platform to contact against and be connected to a support surface, such as a wall or ceiling for indoor or outdoor applications.

The housing 20 also includes one or more face plates 23 that connect to the base 21. The face plates 23 can extend over the entirety or one or more limited sections of the open side. The face plates 23 can connect to the base 21 with one or more fasteners, such as screws or rivets. The face plates 23 are configured to support and position one or more of the waveguides 40 and LED arrays 30. The face plates 23 include one or more openings 25 that align with the surface 45 of the waveguide 40. This provides for the surface 45 to be exposed to provide for the light to emit outward towards the target.

Slots 26 extend through the housing 20 to receive the light adaptation modules 50. In one example as illustrated in FIGS. 1 and 2, the slots 26 extend through a face plate 23. In another example, slots 26 are positioned on the closed side of the base 21.

Figure 10:
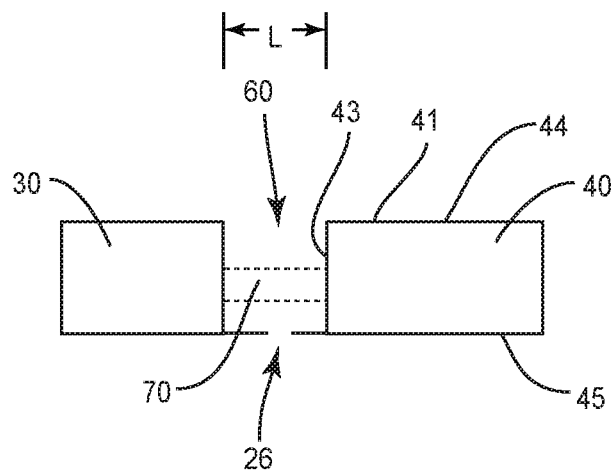
FIG. 10 is a schematic side view of a gap formed between an LED array and a waveguide of a luminaire.

The waveguide 40 and LED array 30 are fixedly positioned within the housing 20. As schematically illustrated in FIG. 10, the LED array 30 is spaced apart from the waveguide 40 by a gap 60. The size of the gap 60 is consistent along the width W of the waveguide 40. The one or more slots 26 are positioned at the gap 60. The LED array 30 emits light along a propagation path 70 towards the waveguide 40. The length L of the gap 60 is measured between the LED array 30 and the coupling portion 43 of the waveguide 40. The size of the length L can vary depending upon the context of use, such as type of LED elements 31 and waveguide 40.

The light developed by the LED array 30 travels across the gap 60 and through the waveguide 40 and is redirected and emitted out through the surface 45. The waveguide 40 directs the light toward a desired illumination target surface with a desired illumination pattern.

Figure 11:
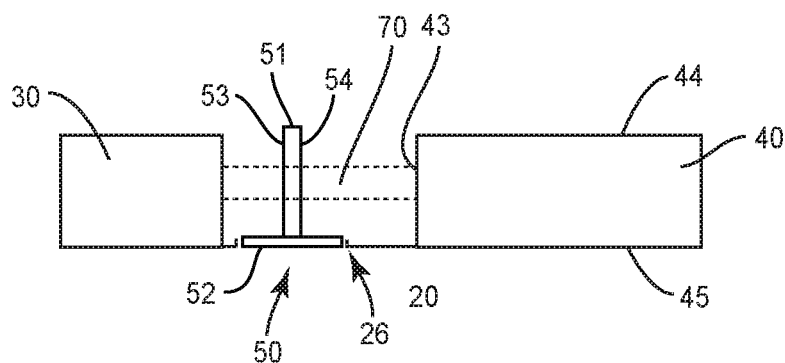
FIG. 11 is a schematic side view of a body of a light adaptation module positioned across the gap of FIG. 10.

The one or more light adaptation modules 50 are configured to alter the color temperature of the light that is emitted from the luminaire 10. FIG. 11 schematically illustrates the light adaptation module 50 mounted to the housing 20. A flange 52 extends across the slot 26 and a body 51 extends between the LED array 30 and the waveguide 40. The body 51 is positioned across the propagation path 70 and alters the light emitted from the LED array 30 to provide a different appearance to the light that is emitted from the waveguide 40.

Figure 12:
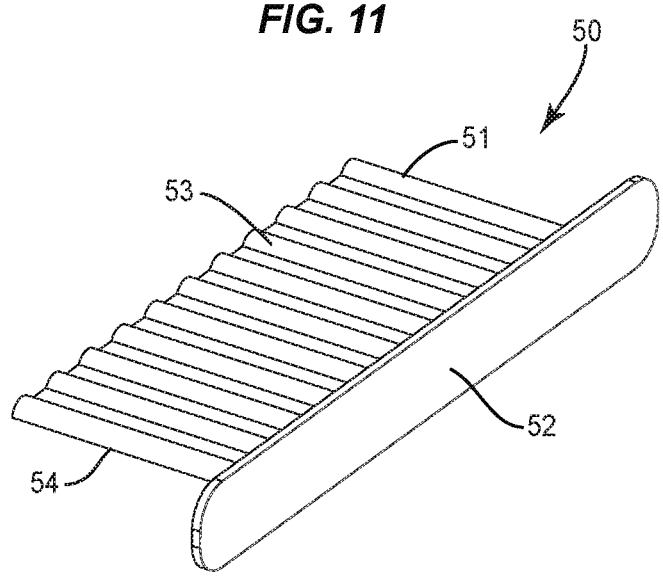
FIG. 12 is perspective view of a light adaptation module.

As illustrated in FIG. 12, the light adaptation module 50 includes the body 51 and flange 52. The body 51 is light-transmissive to allow the passage of light from the LED array 30 to the waveguide 40. The body 51 can be constructed from a variety of materials, including but not limited to one or more of acrylic, polycarbonate, molded silicone, glass and combinations thereof. In one example, the body 51 is constructed from two or more different materials arranged in layers.

As illustrated in the end view of FIG. 12, the body 51 includes a first surface 53 that faces towards the LED array 30 and a second surface 54 that faces towards the waveguide 40 when the light adaptation module 50 is mounted in the housing 20. The body 51 includes a width c measured between the surfaces 53, 54. In one example as illustrated in FIG. 13, the width c is substantially constant along the body 51. In another example, the width c varies along the length. One or both of the surfaces 53, 54 can include various configurations, such as but not limited to smooth, textured, curved, or otherwise shaped to affect light mixing and/or redirection. The configurations promote light and/or color mixing and/or illuminance uniformity.

The body 51 includes one or more phosphors to alter the color temperature of the light. The phosphor absorbs photons of the light that is emitted from the LED array 30 and emits a photon of a different wavelength. In one example, the light absorption module 50 emits what is perceived as white light resulting from a combination of light emission from the LED array 30 and the phosphor. In one example, the LED array 30 that emits light in the blue wavelength spectrum and the light adaptation module 50 absorbs some of the blue light and re-emits light in the yellow wavelength spectrum. In another example, the LED array 30 emits light which is altered by the light absorption module 50 to change the light to a non-white light combination of blue and yellow light.

The color temperature of the light is measured in kelvin (K). The light absorption module 50 is configured to change the color temperature of the outputted light as needed. In one example, the light absorption module 50 changes the light to between 2000K-3000K to provide a softer, white glow that can be yellow in appearance. Examples for this application include within interior spaces such as dining rooms and bedrooms. In another example, the light absorption module 50 changes the color temperature to between 3000K-4500K to provide a brighter appearance. Examples of contexts of use include within kitchens and offices. In one example, the light adaptation module 50 changes the color temperature to give off a brighter blue-white light in the range of 4500K-6500K for use in work spaces. In one specific example, the LED array 30 is configured to emit light with a 5000K color temperature. One light adaptation module 50 is mounted in the slot 26 of the housing 20 to change the output to light with a color temperature of 4000K. A different second light adaptation module 50 can change the light output to a color temperature of 3000K.

In one example, the phosphors are packaged as powders of micrometer scale particles. In one example, the particles are mixed with the waveguide material and integrated into the waveguide 40. In another example, the particles are integrated into carrier materials that can be coated onto the body 51. FIG. 14 schematically illustrates a phosphor coating 55 applied to the base 51. In this example, the phosphor coating 55 is applied on the first surface 53. In another example, the phosphor coating 55 is applied to the second surface 54. The base 51 can include two or more coatings 55. FIG. 15 includes an example with different coatings 55a, 55b each applied at the first surface 53. Coating 55b is applied to the first surface 53, and coating 55a is applied on the coating 55b. In a similar example, one of the coatings 55a or 55b is applied on the first surface 53, and the other coatings 55a or 55b is applied on the second surface 54. In another example with the base 51 formed by multiple layers, one or more coatings 55 are applied on an interior surface of one or more of the layers. The number and positioning of the different coatings 55 on the base 51 can vary. Further, the different coatings can have different thicknesses to adjust the color temperature.

The flange 52 supports and positions the body 51 when the light adaptation module 50 is mounted in the housing 20. The flange 52 is constructed from a rigid material such as but not limited to plastic and various metals. The flange 52 is sized to extend over the slot 26 to position the body 51 along the propagation path 70. The flange 52 can also prevent the ingress of debris or water into the slot 26. A seal, such as a washer, can be mounted to the flange 52 and/or housing 20 to further prevent the ingress.

Figure 16:
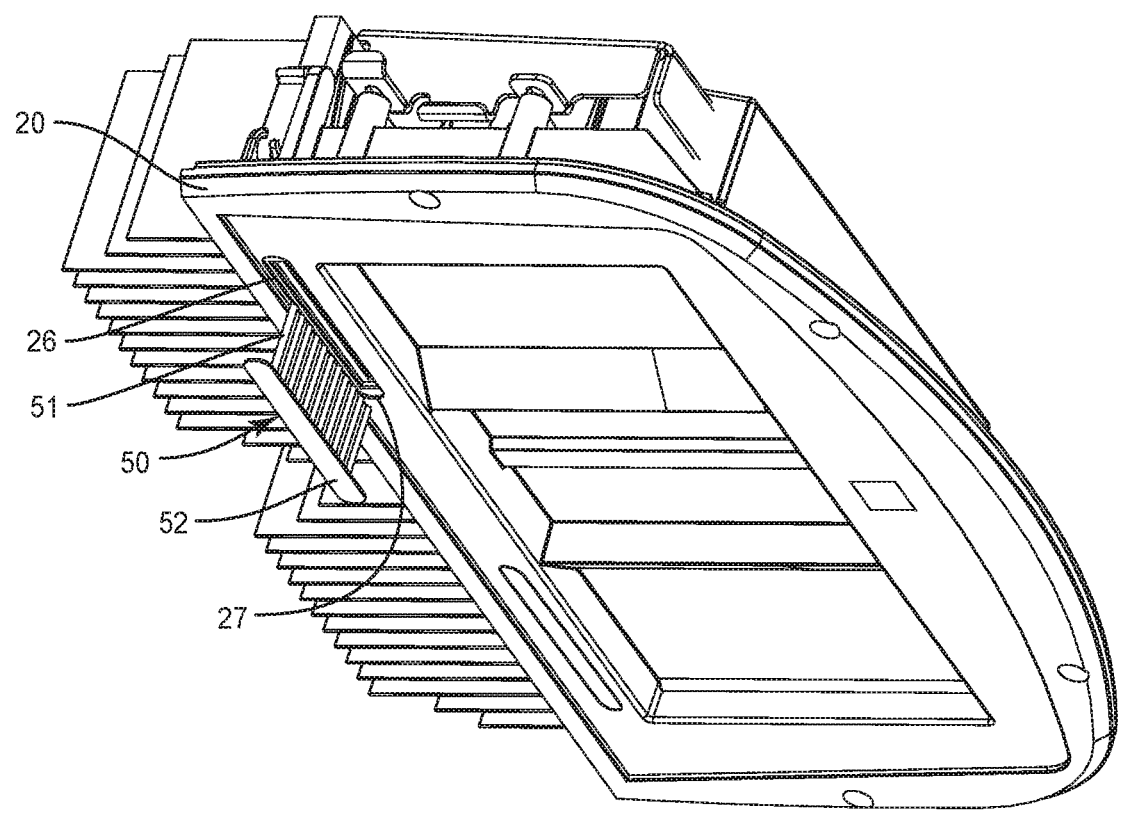
FIG. 16 is a bottom perspective view of a light adaptation module removed from a slot in a housing of a luminaire.

FIG. 16 illustrates a light adaptation module 50 positioned outward from a slot 26 in the housing 20. The body 51 is sized to be inserted into the slot 26 and includes a width that is smaller than the slot 26 to provide for insertion. Flange 52 includes a width that is larger than the slot 26 to remain on the exterior of the housing 20. Flange 52 is sized to fit within a recess 27 that is positioned at the slot 26 and extends into the housing 20. In one example, the flange 52 seats within the recess 27 with the outer surface of the flange 52 being flush with the outer surface of the housing 20.

The adaptation module 50 can be attached to the housing 20 in a variety of different manners. In one example, a ball-and-detent connector maintains the light adaptation module 50 engaged in the housing 20. In another example, one or more mechanical fasteners extend through the flange 52 and into the housing 20 to maintain the engagement. In another example, the body 51 and/or flange 52 forms a friction fit to maintain the attachment.

Figure 17A:
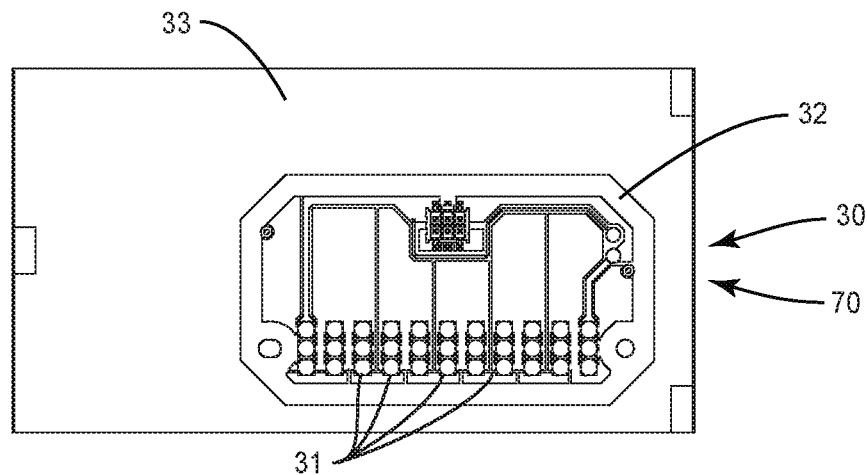
FIG. 17A is a schematic side view of an LED array mounted on a heat sink.
Figure 17B:
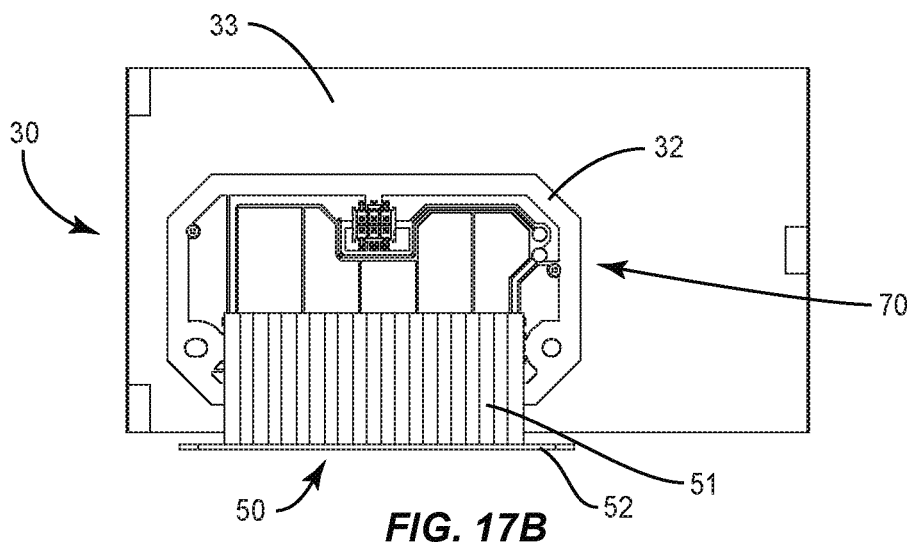
FIG. 17B is a schematic side view of a light adaptation module mounted across the LED array of FIG. 17A.

When the light adaptation module 50 is mounted in the housing 20, the body 51 extends over the one or more light elements 31 of the LED array 30. FIG. 17A illustrates an LED array 30 positioned on a heat sink 33. Light elements 31 are positioned to emit light towards the waveguide 40 (not illustrated in FIG. 17A). When the light adaptation module 50 is mounted to the housing 20 as illustrated in FIG. 17B, the body 51 is positioned in the light propagation path 70 and extends over the light elements 31. The flange 52 is positioned away from the light elements 31 to prevent interference with the light that is emitted to the waveguide 40.

The luminaire 10 can include one or more LED arrays 30, waveguides 40, and modules 50. In one example, the luminaire 10 includes a pair of LED arrays 30, a single waveguide 40, and a pair of modules 50.

In one example as illustrated in FIGS. 1 and 2, the luminaire 10 includes a pair of light adaption modules 50 and a pair of LED arrays 30. The modules 50 are aligned in a side-by-side arrangement with each module 50 adjusting the light output from one of the LED arrays 30. In another example, the luminaire 10 includes a single LED array 30 that is adjusted by one or more modules 50.

In examples that include multiple light adaptation modules 50, the different modules 50 are each the same to adjust the light in a similar manner. In another example, two or more of the modules 50 are different to adjust the light differently. In one example, the luminaire 10 includes multiple LED arrays 30 and multiple modules 50. The luminaire 10 is configured to operate in a first manner with a first set of the LED arrays 30 being activated to emit light. A first set of the modules 50 are positioned along the one or more propagation paths to adjust the light. The luminaire 10 is further configured to operate in a second manner with a different second set of LED arrays 30 activated to emit light. A different second set of modules 50 are positioned to adjust the light from the second set.

Figure 18:
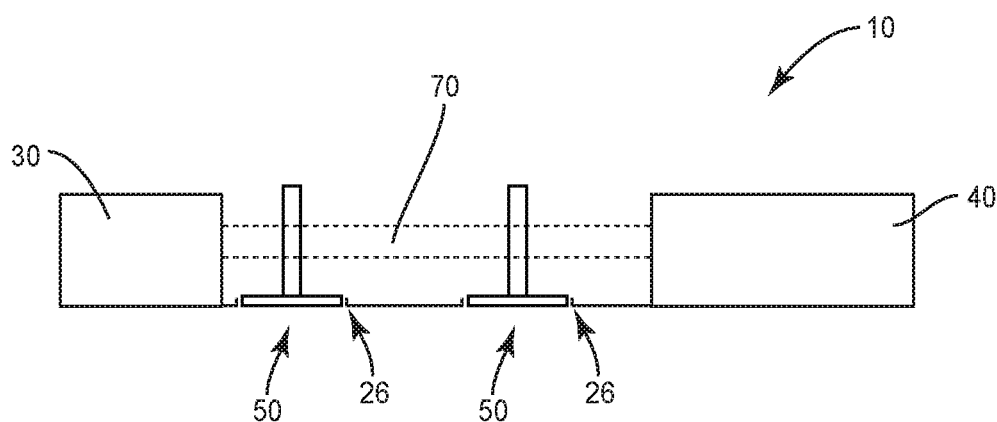
FIG. 18 is a schematic side view of a pair of light adaptation modules mounted within a gap formed between an LED array and a waveguide.

In the example of FIGS. 1 and 2, the modules 50 are in a side-by-side arrangement such that the light passes through one of the modules 50. In another example as illustrated schematically in FIG. 18, two or more modules 50 are arranged in series along a single propagation path 70. Light emitted from the LED array 30 travels through the two or more modules 50 and then into the waveguide 40. A first one of the modules 50 adjusts the light a first amount and a second one of the modules 50 adjusts the light a second amount. This luminaire 10 can also be used with a single module 50 inserted across the propagation path 70 (i.e., with one of more of the slots 26 being empty).

Figure 19:
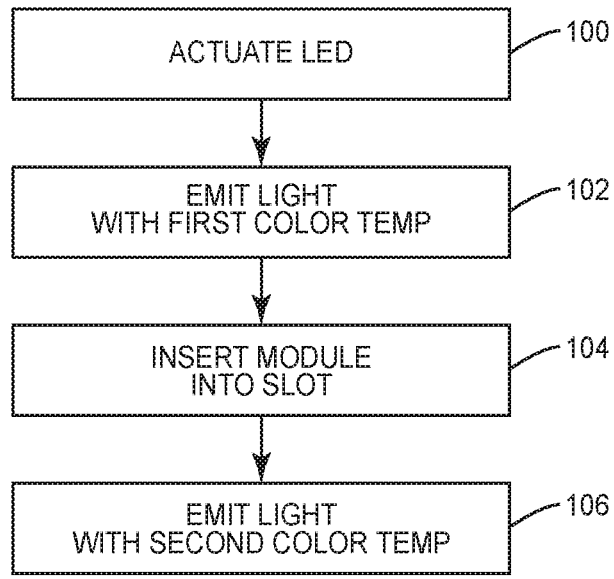
FIG. 19 is a flowchart diagram of a method of using a luminaire.

FIG. 19 illustrates a method of using the luminaire 10. The LED array 30 is activated (block 100) and light with a first color temperature is emitted from the luminaire (block 102). In this first arrangement, no light adaptation module 50 is inserted into the housing 20.

The method further includes inserting a module 50 into the slot 26 in the housing 20 (block 104). This positions a body 51 of the module 50 across the light propagation path 70 and results in light with a different second color temperature being emitted from the luminaire (block 106).

In this example of FIG. 19, the luminaire 10 can be used in either of the arrangements. In one example, the slot 26 in the housing that receives the module 50 is sealed to prevent water or debris from entering into the interior space when no module 50 is inserted.

Figure 20:
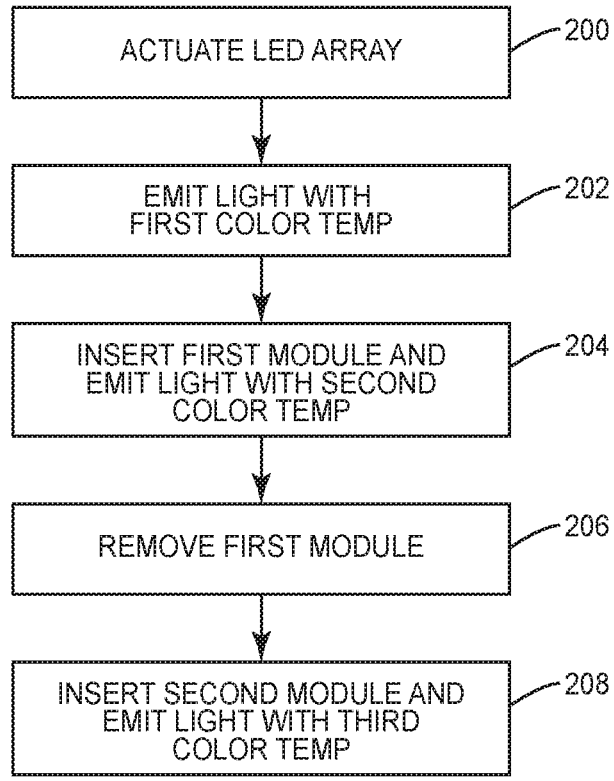
FIG. 20 is a flowchart diagram of a method of using a luminaire.

FIG. 20 illustrates another method of using the luminaire 10 that is positioned in a space. The luminaire 10 is powered and the LED array 30 is activated (block 200). The light emitted from the LED array 30 passes through the waveguide 40 and is emitted and has a first color temperature (block 202). To change the color temperature, a first light adaptation module 50 is inserted into the slot 26 (block 204). This second color temperature provides a difference appearance and provides for using the luminaire 10 for different contexts.

At some time thereafter, the first module 50 is removed from the slot 26 (block 206) resulting in the first light again being emitted from the luminaire 10. A second module 50 is inserted into the slot 26 resulting in a third color temperature to be emitted from the luminaire 10. The third color temperature is different from the first and second color temperatures.

In the various methods of use, the luminaire 10 can be adjusted while in the field (i.e., while the luminaire 10 is positioned at the lighted space). The luminaire 10 can be positioned such that the one or more slots 26 are accessible to provide for inserting and/or removing light adaptation modules 50 as necessary.

In one example, the light adaptation modules 50 do not negatively impact the optical distribution. In one example with multiple light adaptation modules 50, each of the light adaptation modules has the same impact on optical distribution. In another example, the different modules 50 have different impacts on the optical distribution.

The luminaire 10 can include a variety of shapes and configurations. Examples include but are not limited to downlights, track lights, and spot fixtures.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein. Although steps of various processes or methods described herein may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention.

What is claimed is:

1. A luminaire comprising:
    a light emitting diode (LED) array configured to produce light in a first direction along a propagation path;
    an optical waveguide spaced apart from the LED array by a gap and comprising first and second waveguide surfaces, wherein the optical waveguide and the gap are disposed along the propagation path and the optical waveguide is configured to receive the light along the propagation path at the first waveguide surface and transfer the light away from the luminaire at the second waveguide surface; and
    a housing mounted to the LED array and the optical waveguide, the housing comprising a slot directly adjacent to the gap.

2. The luminaire of claim 1, further comprising a light adaptation module engaged with the slot and comprising an optically transmissive body that extends into the propagation path, the body configured to change a color temperature of the light that is emitted from the LED array.

3. The luminaire of claim 2, wherein the optically transmissive body comprises a first surface facing the LED array and an opposing second surface facing the optical waveguide, wherein the optically transmissive body transfers light incident on the first surface to the second surface, and the second surface emits the light toward the optical waveguide.

4. The luminaire of claim 3, wherein the optically transmissive body comprises a phosphor coating such that a color temperature of the light emitted from the second surface is different from a color temperature of the light incident on the first surface.

5. The luminaire of claim 2, wherein the light adaptation module further comprises a flange connected to the optically transmissive body, the flange sized to engage with the housing and position the optically transmissive body across the propagation path.

6. The luminaire of claim 5, wherein the flange seals the slot when engaged with the housing.

7. The luminaire of claim 2, wherein the light adaptation module is a first light adaptation module configured to change the color temperature of the light emitted from the LED array a first amount and further comprising a second light adaptation module configured to change the color temperature of the light from the LED array a different second amount.

8. The luminaire of claim 7, wherein each of the first light adaptation module and the second light adaptation module are configured to fit within the slot and extend across the propagation path.

9. The luminaire of claim 2, wherein the light adaptation module is a first light adaptation module and the slot is a first slot, the luminaire further comprising:
 a second light adaptation module;
 a second slot directly adjacent the gap and spaced away from the first slot;
 wherein the second light adaptation module is engaged with the second slight and comprises a second optically transmissive body that extends into the propagation path.

10. A luminaire comprising:
 a housing comprising an interior cavity and a slot that extends into the interior cavity;
 a light emitting diode (LED) array mounted to the housing within the interior cavity and configured to produce light along a propagation path that extends within the interior cavity;
 an optical waveguide mounted to the housing, the optical waveguide positioned along the propagation path to receive the light from the LED array and transfer the light outward from the luminaire; and
 a gap positioned within the interior cavity along the propagation path and between the LED array and the optical waveguide;
 the slot in the housing is aligned with the gap.

11. The luminaire of claim 10, further comprising a light adaptation module comprising an optically transmissive body configured to change a color temperature of the light emitted by the LED array, the light adaptation module configured to engage with the housing with the body extending into the slot and into the propagation path.

12. The luminaire of claim 11, wherein the light adaptation module further comprising a flange mounted to an end of the body, the flange being larger than the slot to extend over the slot when the body is positioned in the slot and into the propagation path.

13. The luminaire of claim 11, wherein the body of the light adaptation module comprises a phosphor coating configured to change the color temperature of the light emitted by the LED array.

14. A method of using the luminaire of claim 2, the method comprising:
 positioning the light adaptation module into the housing and between the light emitting diode (LED) array and the optical waveguide;
 operating the luminaire in a first operating mode by transferring the light from the LED array to the optical waveguide via the light adaptation module disposed in the gap between the LED array and the optical waveguide;
 removing the light adaptation module from the housing; and
 operating the luminaire in a second operating mode with the light adaptation module removed by transferring light from the LED array to the optical waveguide via the gap without transferring the light through the light adaptation module.

15. The method of claim 14, further comprising switching from the first operating mode to the second operating mode.

16. The method of claim 15, further comprising modifying the color temperature of the light as the light transfers via the light adaptation module.

17. The method of claim 14, further comprising switching from the second operating mode to the first operating mode.

18. The method of claim 14, further comprising retaining the light adaptation module within the housing of the luminaire in the first operating mode.

19. The method of claim 18, further comprising positioning the light adaptation module through the slot in the housing in the first operating mode.

20. The method of claim 14, wherein the light adaptation module is a first light adaptation module and further comprising positioning a second light adaptation module into the housing between the LED array and the optical waveguide and operating the luminaire in a third operating mode by transferring the light from the LED array to the optical waveguide via both the first and second light adaptation modules.

* * * * *